(12) United States Patent
Hummel et al.

(10) Patent No.: US 6,471,303 B1
(45) Date of Patent: Oct. 29, 2002

(54) WHEEL FOR A MOTOR VEHICLE AND METHOD OF MAKING SAME

(75) Inventors: Frank Hummel, Eningen; Jens Stach, Heimshein, both of (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/762,687

(22) PCT Filed: Jun. 6, 2000

(86) PCT No.: PCT/EP00/05178
§ 371 (c)(1),
(2), (4) Date: Apr. 20, 2001

(87) PCT Pub. No.: WO00/76786
PCT Pub. Date: Dec. 21, 2000

(30) Foreign Application Priority Data

Jun. 11, 1999 (DE) .......................................... 199 26 575

(51) Int. Cl.⁷ ................................................. B60B 1/06
(52) U.S. Cl. ........................................ 301/65; 301/66
(58) Field of Search ................. 301/65, 66, 64.701, 301/64.702, 64.703, 64.704, 64.705, 95.101, 104; 295/8; 164/98, 92

(56) References Cited

U.S. PATENT DOCUMENTS

| | | | | |
|---|---|---|---|---|
| 1,635,490 A | * | 7/1927 | Meldrum ...................... | 301/65 |
| 1,641,107 A | * | 8/1927 | Walther ........................ | 301/65 |
| 3,253,862 A | | 5/1966 | Watanabe et al. ............. | 301/65 |
| 3,856,360 A | * | 12/1974 | Lindberg et al. ............... | 301/65 |
| 3,968,996 A | * | 7/1976 | Wilcox ........................ | 301/64.7 |
| 4,000,926 A | * | 1/1977 | Wilcox ........................ | 301/64.7 |
| 4,035,028 A | * | 7/1977 | Wilcox ........................ | 301/63 |
| 4,252,378 A | * | 2/1981 | DeBolt et al. ............. | 301/64.7 |
| 5,080,444 A | * | 1/1992 | Hopkins et al. ........... | 301/64.7 |
| 5,415,464 A | * | 5/1995 | Scott ............................ | 301/65 |
| 5,433,511 A | * | 7/1995 | Wei .............................. | 301/64.3 |
| 5,527,101 A | * | 6/1996 | Kato et al. ................... | 301/65 |
| 5,538,329 A | * | 7/1996 | Stach ........................... | 301/65 |
| 5,564,793 A | * | 10/1996 | Whiteford .................. | 301/64.7 |
| 5,575,539 A | * | 11/1996 | Stach ........................... | 305/65 |
| 5,896,912 A | * | 4/1999 | Monroe et al. .............. | 164/134 |
| 5,992,500 A | * | 11/1999 | Schneider et al. ............ | 164/98 |
| 6,024,415 A | * | 2/2000 | Stach ......................... | 301/64.2 |
| 6,231,129 B1 | * | 5/2001 | Stach ........................... | 301/65 |
| 6,325,462 B1 | * | 12/2001 | Hummel et al. .............. | 301/65 |
| 6,364,425 B1 | * | 4/2002 | Marquis ...................... | 301/65 |

FOREIGN PATENT DOCUMENTS

| | | |
|---|---|---|
| DE | 41 38 558 | 5/1993 |
| DE | 195 01 508 | 4/1996 |
| EP | 826 442 | 3/1998 |
| EP | 922 591 | 6/1999 |
| WO | WO 99/39923 | 8/1999 |

* cited by examiner

Primary Examiner—S. Joseph Morano
Assistant Examiner—Long Bao Nguyen
(74) Attorney, Agent, or Firm—Crowell & Moring LLP

(57) ABSTRACT

A wheel for a motor vehicle includes cavities in a spoked rim structure. These cavities are provided with a removable sand core or with a remaining core, for example, made of metal foam. A rim, or a rim and a rim flange, may be connected with the spoked rim structure, so that a two-part or a three-part wheel can be produced in a simple manner.

16 Claims, 3 Drawing Sheets

| a | 130.00 – 135.00 |
| b | 125.00 – 130.00 |
| c | 120.00 – 125.00 |
| d | 115.00 – 120.00 |
| e | 110.00 – 115.00 |
| f | 105.00 – 110.00 |
| g | 100.00 – 105.00 |
| h | 95.00 – 100.00 |

WHEEL FOR A MOTOR VEHICLE AND METHOD OF MAKING SAME

BACKGROUND AND SUMMARY OF THE INVENTION

The invention relates to a wheel for a motor vehicle.

From German Patent Document DE 41 38 558 A1, a wheel for a motor vehicle is known, in which a spoked rim structure is constructed with hollow spokes which are produced by casting by use of a removable sand core. The sand core is arranged in an exposed manner between a lower and an upper mold. Furthermore, from U.S. Pat. No. 3,253,862, a vehicle wheel is known which has metal wool inside spoke cavities. In addition, from German Patent Document DE 195 01 508 C1, a steering knuckle for a motor vehicle axle is known which has aluminum foam in a cavity.

It is an object of the invention to provide a wheel for a vehicle which has a spoked rim structure and a rim, in which hollow spokes are arranged in the spoked rim structure and can be produced in a simple manner with a remaining core or with a removable core.

The principal advantages achieved by the invention are that, by means of simple casting techniques, a spoked rim structure with hollow spokes having either a remaining core, for example, comprising metal foam, or a removable core, for example, comprising sand, can be produced in a mold tool.

In the case of a spoked rim structure with hollow spokes in the spoked rims which are open radially outwardly, a core bearing is required so that, in the casting condition, a core portion is supported which protrudes radially beyond the circumference of the spoked rim whether the core portion is made of metal foam or made of sand. For this purpose, a corresponding recess is provided in the upper mold of the tool, which recess is tightly closed off by the lower mold.

In order for a connection to be established in a simple manner with a rim as a two-part wheel or with a rim and a rim flange as a three-part wheel, the spoked rim structure is constructed with a wall or lateral ring face which projects to the interior side or exterior side with respect to the additional wall.

As a result, the lateral ring face of the spoked rim structure can be connected in a simple manner with a shoulder of the rim which is placed by means of an upright ring surface against the lateral ring face of the ring spider and covers by means of a rim bottom surface the core or the opening of the hollow spoke from above.

Furthermore, in another preferred embodiment of the present invention, the lateral ring face of the spoked rim structure for the connection with the shoulder of the rim is provided on the interior wall of the spoked rim structure and cavities receiving the remaining core are closed off by a front-side wall.

In order to show that cavities exist in the spokes of the spoked rim structure, the spoke of the spoked rim structure may be provided an opening facing the rim flange area and visible from the outside. Furthermore, an opening could also be arranged in the hub area on the exterior side of the hollow spoke.

Other objects, advantages and novel features of the present invention will become apparent from the following detailed description of the invention when considered in conjunction with the accompanying drawings.

DETAILED DESCRIPTION OF THE DRAWINGS

Figure 1:
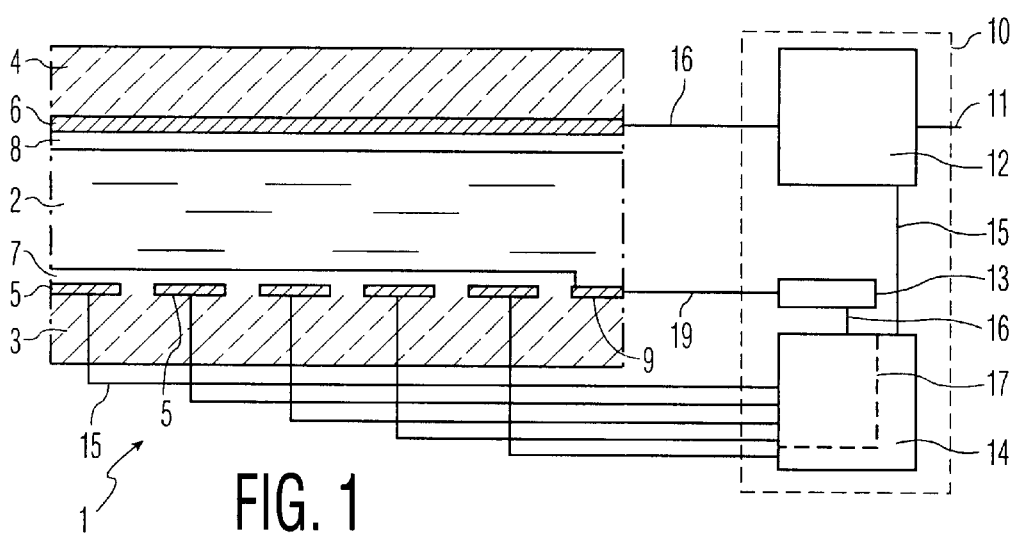
FIG. 1 is a sectional view of a hollow spoke of a spoked rim structure which is arranged in a mold tool and has a protruding core portion made of a metal foam.

A wheel for a motor vehicle comprises a spoked rim structure 1 in which a wheel hub 2 is arranged and with which a rim 3 and a rim flange 4 are connected in one piece or as several pieces. The wheel is produced by casting in a mold tool comprising a lower mold 5 and an upper mold 6.

Figure 2:
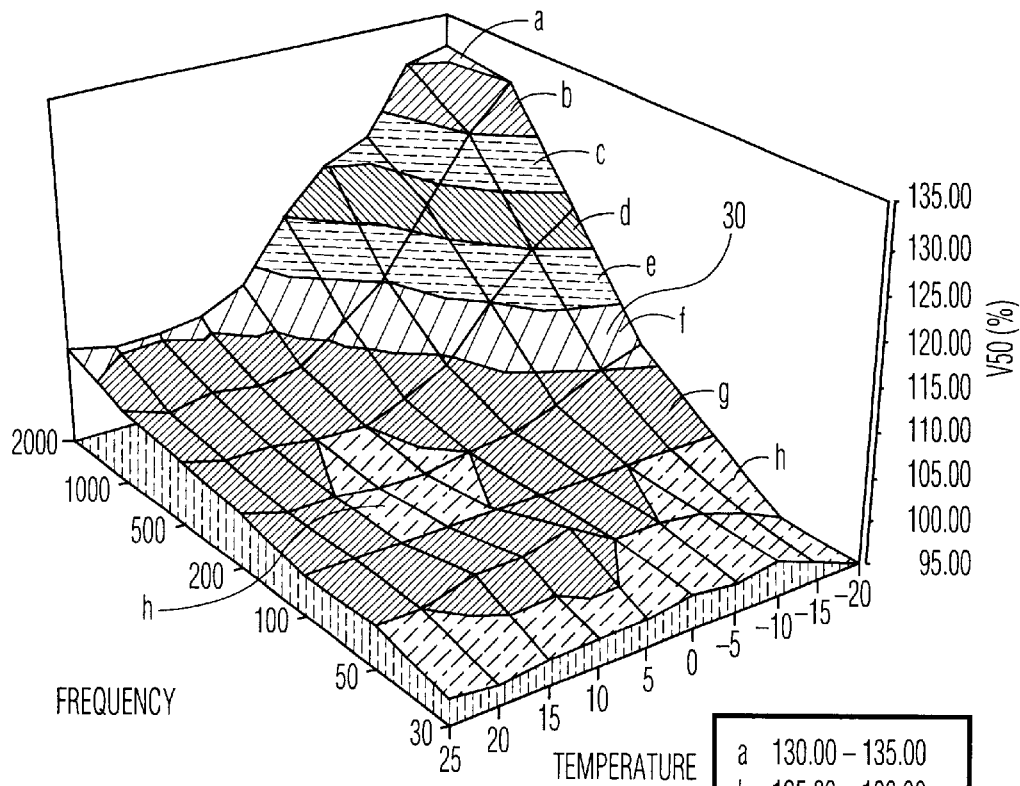
FIG. 2 is a sectional view of a hollow spoke of a spoked rim structure which is arranged in a mold tool and has a protruding removable core portion made of sand.

In FIGS. 1 and 2, the mold tool 5, 6 for casting the wheel is illustrated in detail. Referring to FIG. 1, in a cavity 7, the spoked rim structure 1 is arranged which has a remaining core 8. Referring to FIG. 2, in a cavity 7a, a spoked rim structure 1 is arranged which has a removable sand core 8a. The remaining core 8 may comprise a metal foam or a similar mass.

By means of a core portion K or Ka, the core 8 or 8a extends beyond the circumference of the spoked rim structure 1 and is disposed between the lower and upper mold 5, 6 in a recess 10 of the upper mold 6. As illustrated in detail in FIG. 1, the core portion K of the remaining core 8 is cut off beyond the circumference at the level of the dash-dotted line. The core 8a is removed by way of a front-side opening in the spoke 1.

Figure 3:
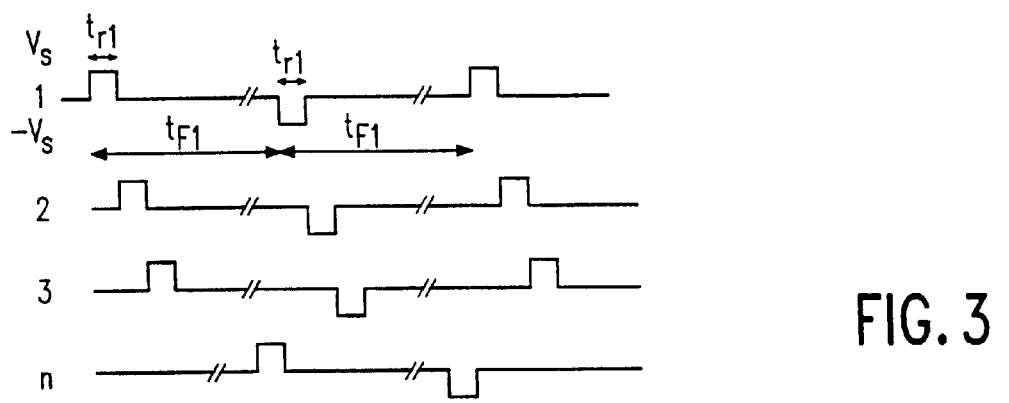
FIG. 3 is a sectional view of a two-part wheel with a core-free cavity and a connection of the rim on an exterior lateral ring face.

According to FIGS. 2 and 3, the spoked rim structure 1 has an exterior wall 12 with a lateral ring surface 13 which is constructed to be projecting with respect to an interior wall 14. According to FIG. 4, the interior wall 14 is constructed with a lateral ring surface 15 which is arranged in a projecting manner with respect to the exterior wall 12 of the spoked rim structure 1.

Figure 4:
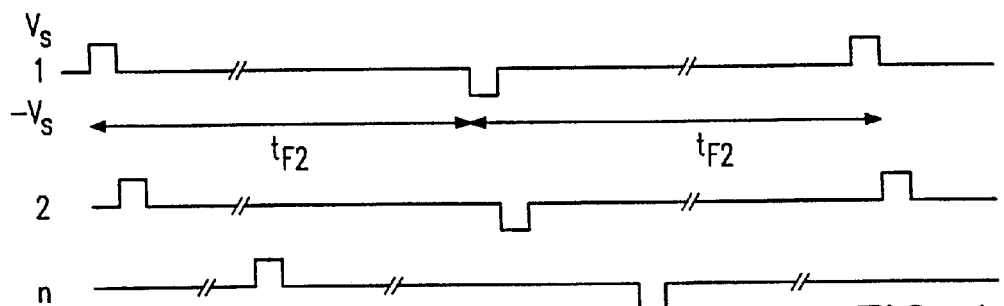
FIG. 4 is a sectional view of a two-part wheel with a core-free cavity in the spoked rim structure and a connection of the rim on an exterior lateral ring surface.

According to FIGS. 3 to 4, the lateral ring surface 13 and 15 is connected with a rim 3. For this purpose, the latter has a shoulder 16 at the rim flange 4, which shoulder 16 has a connection surface situated opposite the lateral ring surface 13 and 15.

According to FIGS. 2 and 3, with the exterior lateral ring surfaces 13, by way of the rim 3, the cavity 7a of the spoked rim structure 1 is covered and closed off.

Figure 7:
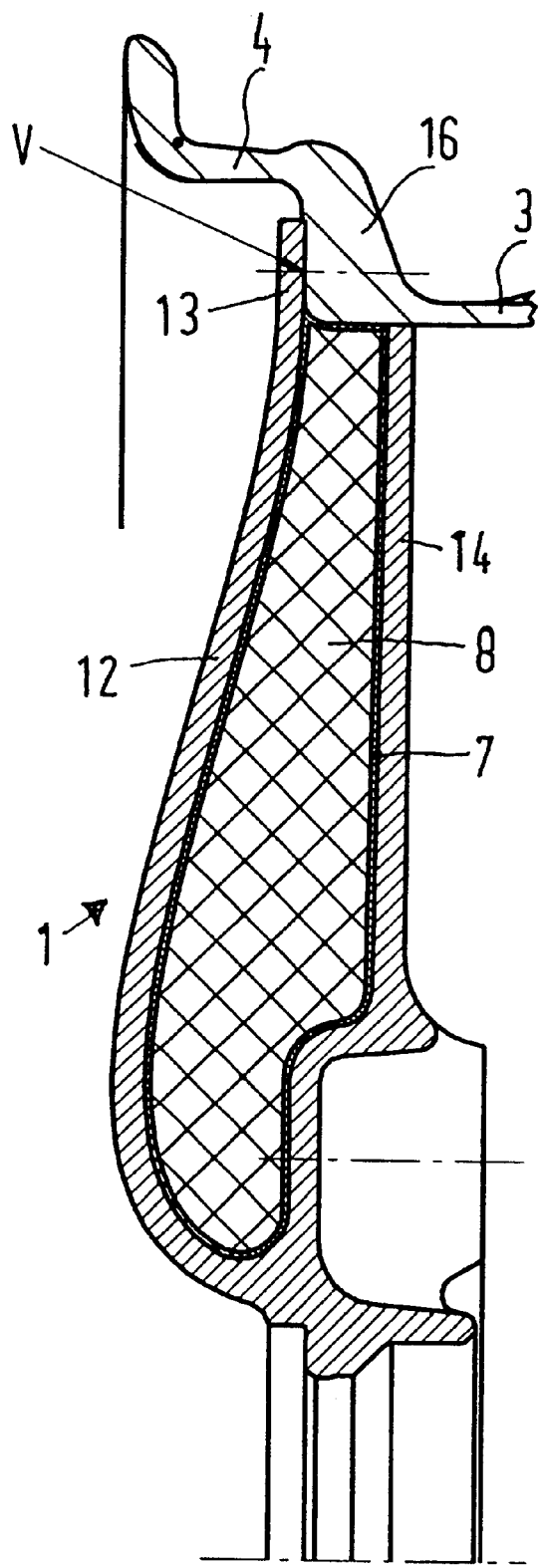
FIG. 7 is a sectional view of a two-part wheel with a hollow spoke of the spoked rim structure and a remaining core in a closed cavity and which can be covered by the rim.

Similarly, according to FIG. 7, with the exterior lateral ring surface 13, by way of a the rim 3, the cavity 7 of the spoked rim structure 1 is covered and closed off.

Figure 5:
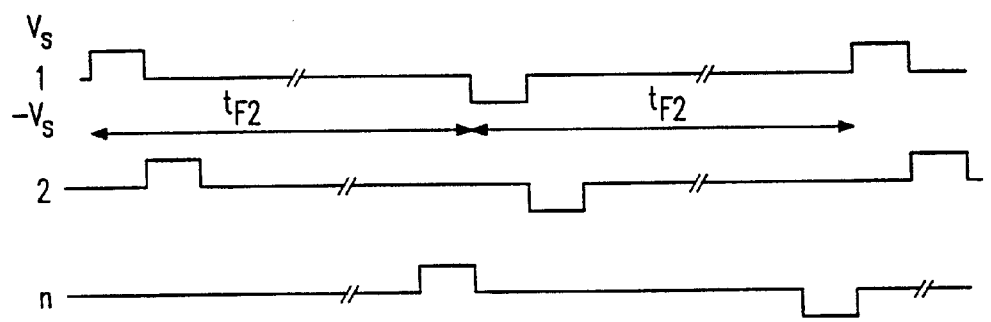
FIG. 5 is a sectional view of a two-part wheel with a core-free cavity and a connection of the rim on an interior lateral ring surface.

FIG. 5 illustrates a three-piece wheel with a remaining core 8 in the cavity 7 of the spoked rim structure 1. On the front side, the cavity 7 is closed off by way of a continuous wall 12a, which leads into the interior wall 14. This wall 14 is provided with a projecting lateral ring surface 15, on which the rim 3 is fastened by way of an inward-pointing section 3a and the rim flange 4 is fastened by way of an inward-pointing section 4a.

Figure 6:
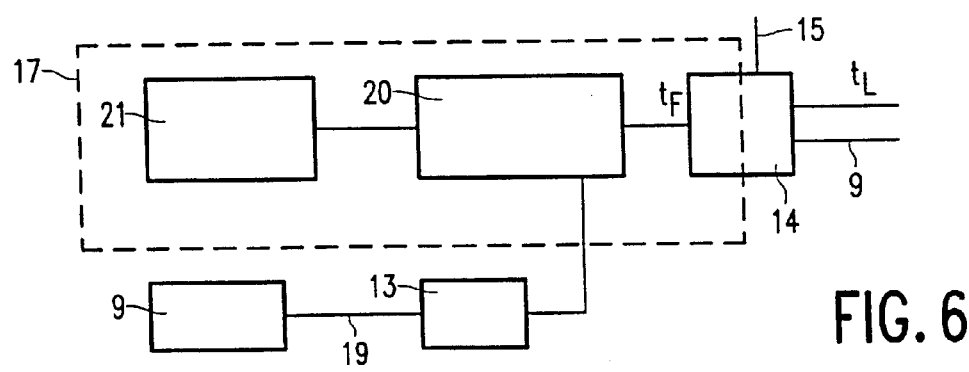
FIG. 6 is a sectional view of a three-part wheel with a hollow spoke in the spoked rim structure and a remaining core in a closed cavity.

According to FIG. 6, the cavity 7 in the spoke of the rim spider 1 as well as in the embodiment according to FIG. 5 are closed off by way of the wall 12a. The rim 3, which is constructed in one piece with the rim flange 4, is connected with the lateral ring surface 15.

In order to show the hollow spokes, these hollow spokes may be provided, according to the invention, with an opening 20, which opening may also be provided in the hub area on the exterior wall 12 of the hollow spoke.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel for a motor vehicle comprising:
    a hollow spoke arranged in a spoked rim structure between air openings, the spoked rim structure being producible in a mold tool comprising a lower mold and an upper mold;
    a remaining core formed in the hollow spoke, the remaining core projecting radially beyond a circumference of the hollow spoke into a recess formed by the lower mold and the upper mold to form a projecting core portion; and
    a lateral ring surface formed by a smooth-surface interior-side or exterior-side wall which projects radially beyond a respective opposite wall surface of the hollow spoke and the lateral ring surface connecting to a rim by a corresponding smooth-surface ring surface.

2. A wheel for a motor vehicle according to claim 1, wherein the lateral ring surface of the spoked rim structure connects with the rim and a separate rim flange part via a connection to form a three-part wheel, the rim flange part and the rim each having a bent-away ring section for the connection.

3. A wheel for a motor vehicle according to claim 1, wherein the lateral ring surface of the spoked rim structure is connected to an offset shoulder of the rim, the shoulder resting on the lateral ring surface of the spoked rim structure by way of an upright ring surface, and a bottom surface of the rim covering the core.

4. A wheel for a motor vehicle according to claim 1, wherein the lateral ring surface is provided on the interior-side wall of the spoked rim structure and connects to a shoulder of the rim, a cavity being formed in the hollow spoke which receives the remaining core and being closed off by a front-side wall.

5. A wheel for a motor vehicle comprising:
    a hollow spoke arranged in a spoked rim structure between air openings, the spoked rim structure being producible in a mold tool comprising a lower mold and an upper mold;
    a removable core formed in the hollow spoke, the removable core projecting radially beyond a circumference of the hollow spoke into a recess formed by the lower mold and the upper mold to form a projecting core portion; and
    a lateral ring surface formed by a smooth-surface interior-side or exterior-side wall which projects radially beyond a respective opposite wall surface of the hollow spoke and the lateral ring surface connecting to a rim by a corresponding smooth-surface ring surface.

6. A wheel for a motor vehicle according to claim 5, wherein the lateral ring surface of the spoked rim structure connects with the rim and a separate rim flange part via a connection to form a three-part wheel, the rim flange part and the rim each having a bent-away ring section for the connection.

7. A wheel for a motor vehicle according to claim 5, wherein the lateral ring surface of the spoked rim structure is connected to an offset shoulder of the rim, the shoulder resting on the lateral ring surface of the spoked rim structure by way of an upright ring surface, and a bottom surface of the rim covering a cavity of the hollow spoke.

8. A wheel for a motor vehicle according to claim 5, wherein the hollow spoke of the spoked rim structure has an opening which faces the rim.

9. A method of making a wheel for a motor vehicle including hollow spokes arranged in a spoked rim structure between air openings, comprising:
    providing a mold tool comprising a lower mold and an upper mold;
    casting a hollow spoke of the spoked rim structure with a remaining core by way of the mold tool, wherein during casting, the remaining core projects radially beyond a circumference of the hollow spoke into a recess formed by the lower mold and the upper mold to form a projecting core portion, wherein the hollow spoke is formed with a lateral ring surface which projects radially beyond a smooth-surface interior-side or exterior-side wall of the hollow spoke; and
    connecting the lateral ring surface of the hollow spoke to a corresponding smooth-surface ring surface of a rim.

10. The method of making a wheel according to claim 9, wherein connecting the lateral ring surface to the rim includes connecting the lateral ring surface to the rim and a separate rim flange part via a connection to form a three-part wheel, the rim flange part and the rim each having a bent-away ring section for the connection.

11. The method of making a wheel according to claim 9, wherein connecting the lateral ring surface to the rim includes connecting the lateral ring surface to an offset shoulder of the rim, the shoulder resting on the lateral ring surface of the spoked rim structure by way of an upright ring surface, and a bottom surface of the rim covering the core.

12. The method of making a wheel according to claim 9, wherein the lateral ring surface of the spoked rim structure is provided on an interior-side wall of the spoked rim structure, and connecting the lateral ring surface to the rim includes connecting the lateral ring surface to a shoulder of the rim, and a cavity receiving the remaining core being closed off by a front-side wall.

13. A method of making a wheel for a motor vehicle including hollow spokes arranged in a spoked rim structure between air openings, comprising:
    providing a mold tool comprising a lower mold and an upper mold;
    casting a hollow spoke of the spoked rim structure with a removable core by way of the mold tool, wherein during casting, the removable core projects radially beyond a circumference of the hollow spoke into a recess formed by the lower mold and the upper mold to form a projecting core portion, wherein the hollow spoke is formed with a lateral ring surface which projects radially beyond a smooth-surface interior-side or exterior-side wall of the hollow spoke; and
    connecting the lateral ring surface of the hollow spoke to a corresponding smooth-surface ring surface of a rim.

14. The method of making a wheel according to claim 13, wherein connecting the lateral ring surface to the rim includes connecting the lateral ring surface to the rim and a separate rim flange part via a connection to form a three-part wheel, the rim flange part and the rim each having a bent-away ring section for the connection.

15. The method of making a wheel according to claim 13, wherein connecting the lateral ring surface to the rim includes connecting the lateral ring surface to an offset shoulder of the rim, the shoulder resting on the lateral ring surface of the spoked rim structure by way of an upright ring surface, and a bottom surface of the rim covering a cavity of the hollow core.

16. The method of making a wheel according to claim 13, wherein the hollow spoke of the spoked rim structure has an opening which faces the rim.

\* \* \* \* \*